United States Patent [19]

Kutaragi

[11] Patent Number: 4,584,598

[45] Date of Patent: Apr. 22, 1986

[54] ELECTRONIC CAMERA

[75] Inventor: Ken Kutaragi, Kawasaki, Japan

[73] Assignee: Sony Corporation, Tokyo, Japan

[21] Appl. No.: 500,822

[22] Filed: Jun. 3, 1983

[30] Foreign Application Priority Data

Jun. 10, 1982 [JP] Japan ................................. 57-99751

[51] Int. Cl.⁴ .............................................. H04N 9/73
[52] U.S. Cl. ........................................ 358/29; 358/41
[58] Field of Search ......................... 358/29, 21 R, 41

[56] References Cited

U.S. PATENT DOCUMENTS

| 4,281,337 | 7/1981 | Nakamura | 358/29 |
| 4,340,903 | 7/1982 | Tamura | 358/29 |
| 4,355,325 | 10/1982 | Nakamura et al. | 358/29 |
| 4,499,487 | 2/1985 | Takayama et al. | 358/29 |

Primary Examiner—Michael A. Masinick
Assistant Examiner—David E. Harvey
Attorney, Agent, or Firm—Lewis H. Eslinger; Alvin Sinderbrand

[57] ABSTRACT

An electronic camera for use in incident light from various sources has a portion which produces a color image signal corresponding to an object in a field of view of the camera and having an adjustable white balance, a circuit which records the color image signal on a record medium, a first light receiving circuit which generates a first signal in response to the luminous intensity of the incident light in the mercury spectrum, a second light receiving circuit which generates a second signal in response to the luminous intensity of the incident light in the near infrared spectrum, and a circuit responsive to the relative values of the first and second signals and correspondingly adjusting the white balance to adapt the camera for use with incident light from a respective one of the sources.

9 Claims, 6 Drawing Figures

ELECTRONIC CAMERA

BACKGROUND OF THE INVENTION

1. Field of the Invention

This invention relates to electronic cameras, and more particularly, to an electronic camera with an accurate white color balance which is automatically set in response to different sources of incident light used to illuminate a subject.

2. Description of the Prior Art

In producing a color image of a subject with a video camera or the like, it is important to determine the color of the light incident upon the subject. So-called "white" light can in fact be of varying colors or color temperatures which a human will subjectively identify as white. For example, a room illuminated by incandescent lamps will appear normal to human vision, and yet the color of the light is more red than brilliant sunlight which is also subjectively identified as normal. Prior art television cameras must be adjusted so that the color white is reproduced as "white" on a monitor, in response to incident light of different colors. Such prior television cameras include means by which the white balance can be selectively adjusted to four discrete settings roughly suitable for four sources of light, such as, brilliant sunlight, cloudy daylight, fluorescent lamps, and incandescent lamps, respectively. Thus, the prior art cameras provide only a coarse or approximate white balance adjustment, and a fine adjustment of the white balance of the displayed color image or picture must be performed by means of a white balance adjustment of a monitoring apparatus such as a video tape recorder, a magnetic disk recorder, or the like.

When a television camera is moved to follow a subject, the white balance necessary to reproduce the color white in a subjectively pleasing manner varies in response to such movement of the subject through shadows and bright sunlight. Since the adjustment with a prior art television camera is only a coarse adjustment, an abrupt and unnatural change occurs in the white balance when the four-position adjustment is changed from one setting to another to compensate for changes in the color of the incident light. It is to be appreciated that the range of changes in the white balance can be quite large when a television camera and portable video tape recorder are used together, making adjustment of the white balance important.

According to one prior art television camera, a light diffusing cap is placed over the lens of the camera and the white balance is adjusted accordingly. As can be appreciated, however, such a camera is inconvenient and cumbersome to use since picture taking must be interrupted to set the camera.

Prior art still cameras which produce video signals from optical images do not generally include means for adjusting the white balance. Of course, a four-way adjustment such as that in a television camera could be included in such a still camera so that the white balance adjustment could be made. However, such an adjustment has not heretofore been provided in a still camera because the camera must be suitable for snapshots and hence, highly portable. The white balance is usually preset for such a still camera to provide easy operation, and hence, the white balance is frequently incorrect. The effect of misadjustment in the white balance is, fortunately, not as pronounced for a still camera as for a television camera, since the still camera takes shots which have more latitude than those taken by a television camera. Nevertheless, it is preferable if the white balance of a still camera is accurately set.

OBJECTS AND SUMMARY OF THE INVENTION

Accordingly, it is an object of the present invention to provide an improved electronic camera which is free from the defects of the prior art.

It is a further object of the present invention to provide an electronic camera in which the white balance can be automatically set to correspond with the light source illuminating the subject.

It is yet another object of the present invention to provide an electronic camera in which the white balance is continuously adjusted when the light source is daylight.

It is yet a further object of the present invention to provide a portable electronic camera in which the white balance is accurately set without human selection.

It is still a further object of the present invention to provide an electronic camera in which the white balance is automatically set when an electronic flash unit is used therewith to illuminate the subject.

In accordance with an aspect of the present invention, an electronic camera for use in incident light from various sources comprises means for producing a color image signal corresponding to an object in a field of view of the camera and having an adjustable white balance, means for recording said color image on a record medium, first light receiving means for generating a first signal in response to the luminous intensity of the incident light in the mercury spectrum, second light receiving means for generating a second signal in response to the luminous intensity of the incident light in the near infrared spectrum, and means responsive to the relative values of the first and second signals and correspondingly adjusting the white balance to adapt the camera for use with incident light from a respective one of the sources.

The above, and other objects, features and advantages of the present invention will be apparent from the following detailed description of an illustrative embodiment thereof which is to be read in connection with the accompanying drawings.

DESCRIPTION OF THE PREFERRED EMBODIMENT

Figure 1:
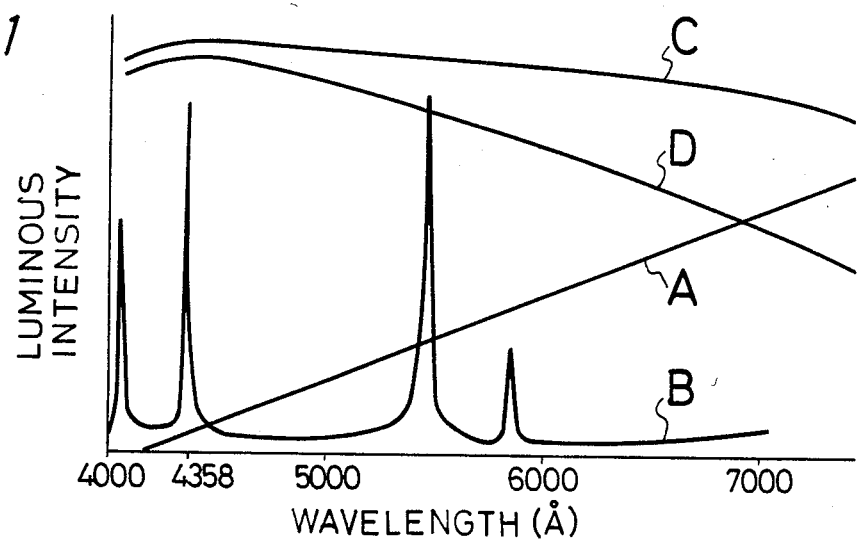
FIG. 1 is graphical illustration of luminous intensity versus the wavelength of light to which reference will be made in explaining the present invention.

Referring to the drawings, and initially to FIG. 1 thereof, the spectra of an incandescent lamp and a fluorescent lamp are respectively indicated by curves A and B. The spectra of natural light or daylight in sunshine and in cloudy daylight are respectively indicated by curves C and D. In accord with the present invention, the luminous intensity of the mercury spectrum (of 4358 Å) and the luminous intensity of the near infrared rays are used to identify the color of the light incident on a subject and hence, the light source used to illuminate the subject. It is to be appreciated that other spectra can be used to identify the light source as well.

For an incandescent lamp, the luminous intensity of light corresponding to the mercury spectrum (4358 Å) is quite low, but the luminous intensity in the near infrared spectrum is quite high (see curve A in FIG. 1). For a fluorescent lamp, the luminous intensity is just the opposite to that of an incandescent lamp, i.e., the luminous intensity in the mercury spectrum is high, but the luminous intensity in the near infrared spectrum is low (see curve B in FIG. 1). For natural light or daylight, the luminous intensities of light corresponding to the mercury spectrum and the near infrared spectrum are both high (see curves C and D in FIG. 1). These properties are utilized in a preferred embodiment of the present invention to identify the light source illuminating the subject.

Thus, the character of a light source can be identified as follows. When the luminous intensity of a light source in the mercury spectrum is high, and that in the near infrared spectrum is low, the light source is identified as a fluorescent lamp. When the luminous intensity in the mercury spectrum is low, and that in the near infrared spectrum is high, the light source is identified as an incandescent lamp. When the luminous intensity in the mercury spectrum is high and that in the near infrared spectrum is also high, the light source is identified as natural light or daylight.

Generally, in accordance with the present invention, the white balance of an electronic camera is set in accordance with the relative luminous intensities of the incident light in the mercury and near infrared spectra. When the light source is daylight, the near infrared spectrum varies according to whether the weather is sunny or cloudy (see curves C and D of FIG. 1), so that, in that case, the white balance is continuously varied in accord with such variations in the spectrum.

One embodiment of a still picture electronic camera in accord with the present invention will be described with reference to FIGS. 2 and 3. In the illustrated embodiment, the still camera includes a solid state image sensing element or sensor and a memory device utilizing, for example, a magnetic disk. One field of the video signal from the solid state image sensor is sequentially recorded on the magnetic disk in one of several concentric circular tracks.

Figure 2:
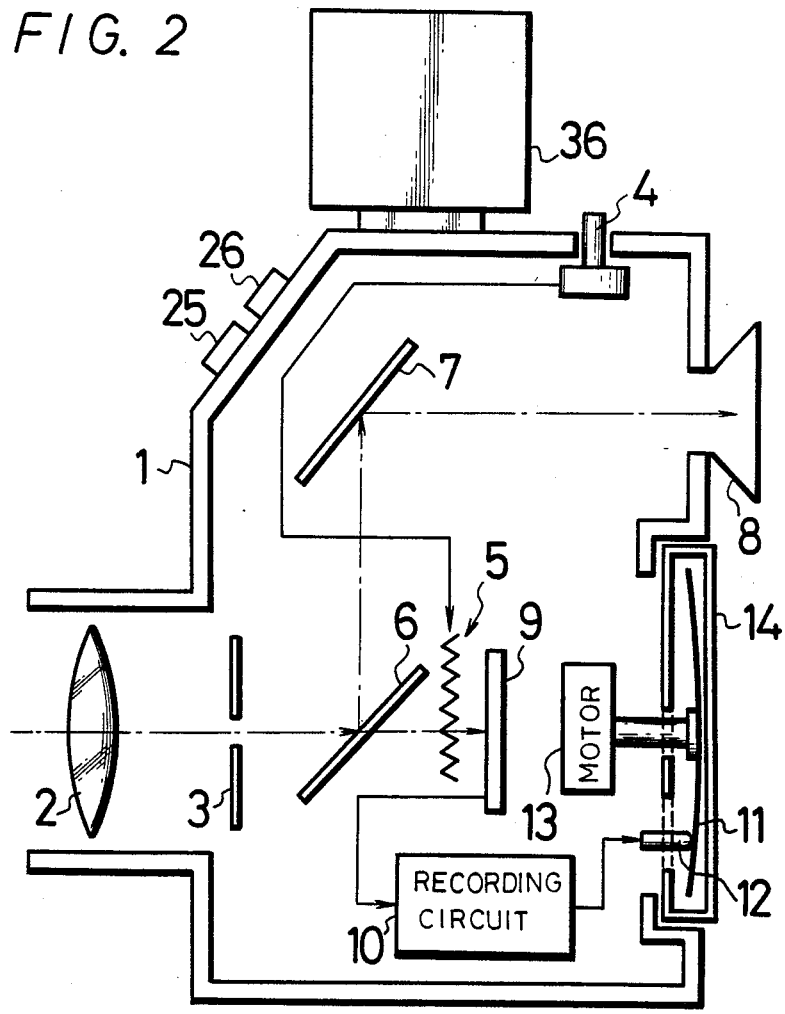
FIG. 2 is a diagrammatic illustration of an electronic camera according to an embodiment of the present invention.

In FIG. 2, the electronic camera includes a housing 1 which houses a lens system 2, an iris or diaphragm mechanism 3, a shutter release button 4, a shutter mechanism 5 coupled to shutter release button 4, a half or semi-silvered mirror 6, a reflecting mirror 7, and a viewfinder 8. These elements are, of course, commonly found in conventional single lens reflex cameras. The electronic camera of FIG. 2 also includes elements specific to an electronic still camera, for example, a solid state image sensor 9 which is, in the preferred embodiment, a charge coupled device (CCD) which converts the light passing through half or semi-silvered mirror 6 to a corresponding output signal. A signal processor or controller 10 processes the output signal from solid state image sensor 9 and generates a video signal in response thereto. A magnetic head 12 records the video signal from controller 10 on a recording medium which is, in the illustrated embodiment, a rotary magnetic disk 11. A motor 13 is used to rotate magnetic disk 11. A jacket 14 houses magnetic disk 11 and is so constructed that it can be inserted into housing 1 from the outside. As explained hereinbefore, each concentric track on magnetic disk 11 contains one picture image.

In reproducing an image stored on magnetic disk 11, a playback magnetic head is moved therealong in a radial direction from, for example, the center to the outer periphery. Thus, one still picture for each track can be reproduced as an image on a ordinary television receiver or the like.

Figure 3:
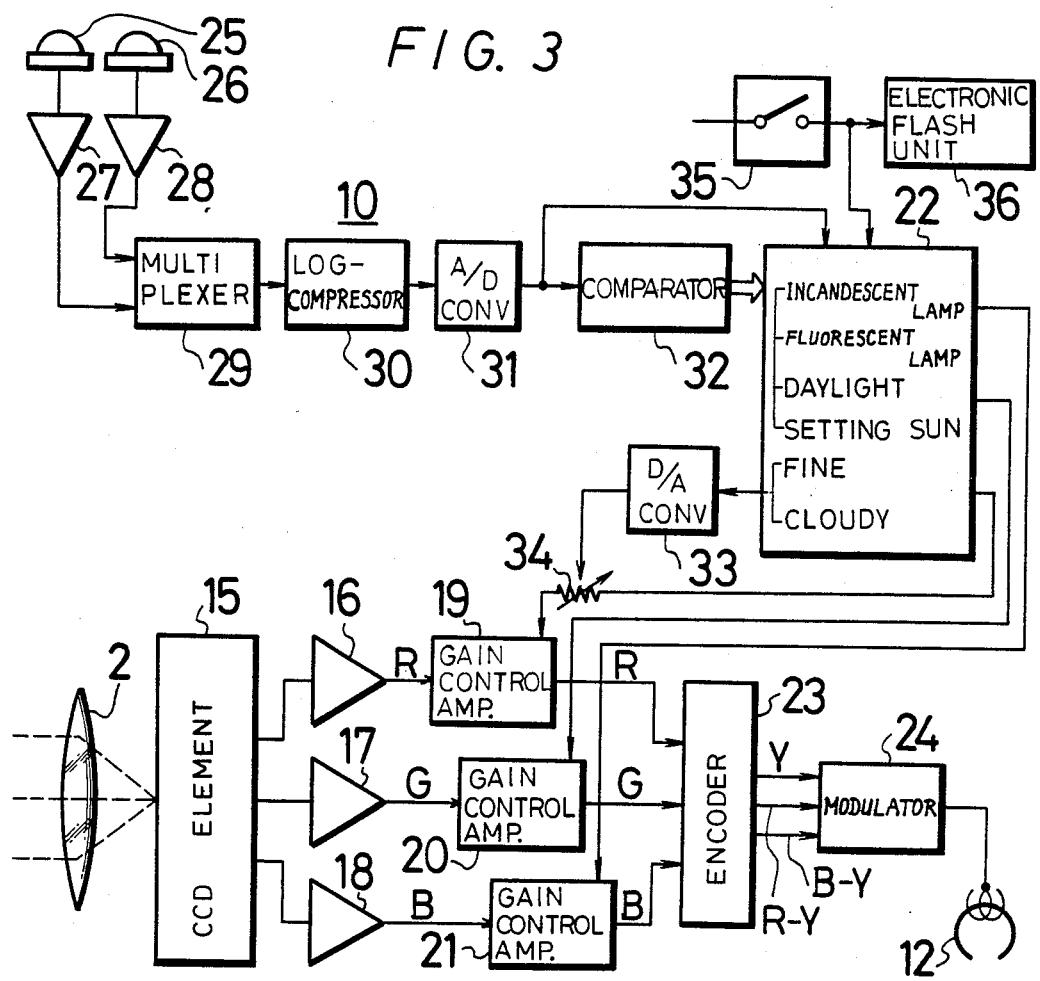
FIG. 3 is a block diagram of a portion of the embodiment of FIG. 2.

FIG. 3 illustrates in block form the component elements of signal processor or controller 10 of FIG. 2. A solid state image sensor 15, for example, a single plate type using an optical filter with a checkered pattern, is used to color separate the light from lens 2 and produce primary color signals R, G and B. Primary color signals R, G and B from solid state image sensor 15 are supplied through respective preamplifiers 16, 17 and 18 to gain control amplifiers 19, 20 and 21. The gains of gain control amplifiers 19, 20 and 21 are controlled by control signals from a controller 22 which is, in the preferred embodiment, a suitable microprocessor programmed in accord with the flowcharts of FIGS. 5A and 5B. Primary color signals R, G and B, amplified by respective gain control amplifiers 19, 20 and 21, are supplied to an encoder 23 which produces a luminance signal Y, and color difference signals R-Y and B-Y in accord with the primary color signals R, G and B. Luminance signal Y and color difference signals R-Y and B-Y are supplied to a modulating circuit 24 included at the rear stage of the imaging portion of the illustrated electronic camera. The color difference signals are modulated with a predetermined signal and then fed to magnetic head 12 to be recorded on magnetic disk 11 (see FIG. 2). Luminance signal Y is FM modulated at a high frequency, while color difference signals R-Y and B-Y are converted to low frequency signals in modulating circuit 24. Color difference signals R-Y and B-Y, which are converted to low frequencies, appear at every other scanning line to form a picture on a television screen.

A light receiving element 25 receives light corresponding to the mercury spectrum (4358 Å). A light receiving element 26 receives light from the near infrared spectrum, for example, 7000 Å. In the embodiment of FIG. 2, light receiving elements 25 and 26 are both located on a forward slanting upper surface of housing 1. Light receiving elements 25, 26 perform a photometric analysis of the light incident on the electronic camera which is assumed to be the same as the light incident on the subject. Light receiving elements 25, 26 supply output signals to respective preamplifiers 27, 28, where they are amplified and then supplied to a multiplexer 29. Multiplexer 29 multiplexes the output signals from preamplifiers 27, 28 and supplies the multiplexed signals to a logarithmic compressor 30. Logarithmic compressor 30 supplies the logarithmically compressed signals to an analog to digital converter 31 which generates digital signals in response thereto. The digital signals from analog to digital converter 31 are supplied to a comparator 32 and to controller 22. Comparator 32, which includes a memory unit in the preferred embodiment, compares the levels of the sequentially supplied signals which correspond to the light received by light receiving elements 25 and 26. More specifically, comparator 32 compares the luminous intensity of the mercury spectrum with that of near infrared spectrum and supplies the compared result to controller 22.

Controller 22 determines whether a light source is an incandescent lamp, a fluorescent lamp or daylight using the algorithms identified above, i.e., the luminous intensities of the mercury and near infrared spectra. Controller 22 supplies gain control signals to gain control amplifiers 19, 20 and 21 in accord with the determination of the identity of the light source. The gains thus determined correspond, of course, to the spectra of an incandescent lamp, a fluorescent lamp, bright sunshine, and cloudy daylight, as indicated by curves A, B, C and D in FIG. 1. When the determination is either an incandescent or fluorescent lamp, the gains of gain control amplifiers 19, 20, and 21 are adjusted only once. In the case of daylight, on the other hand, the gains of gain control amplifiers 20 and 21, corresponding to the colors green and blue, are set only once, but the gain of gain control amplifier 19, corresponding to the color red, is continuously varied in response to the luminous intensity of the near infrared spectrum. This continuous adjustment of the red balance for daylight is performed because natural light conditions can change relatively easily, as compared to artificial light conditions, which are relatively fixed.

A signal in accord with the luminous intensity of light received by light receiving element 26 for discriminating the near infrared spectrum is digitized by analog to digital converter 31, and then later re-converted to an analog signal by a digital to analog converter 33. The analog signal from digital to analog converter 33 is supplied to a variable resistor 34 which is connected between controller 22 and gain control amplifier 19 (corresponding to the color red). Accordingly, the gain of gain control amplifier 19, which amplifies the primary color signal R, can be continuously varied. For cloudy daylight, variable resistor 34 is set to assume a large resistance value so as to decrease the level of the red primary color signal R. In the case of bright sunlight, the resistance value of variable resistor 34 is set to assume a low value so that the level of the red primary color signal R is high. The white balance can be set over the spectrum from sunny conditions to cloudy conditions, as indicated by curves C and D in FIG. 1, by the appropriate adjustment of variable resistor 34.

When shutter button 4 is actuated, light receiving elements 25 and 26 detect the luminous intensities of the mercury spectrum and the near infrared spectrum in sequence. The output signals therefrom are compared in comparator 32. When the output signal from light receiving element 26 is large and the output signal from light receiving element 25 is small, controller 22 determines that the light source is an incandescent lamp, and the gains of gain control amplifiers 19, 20 and 21 are set to corresponding values. On the other hand, when the output signal from light receiving element 26 is small and that from light receiving element 25 is large, controller 22 determines that the light source is a fluorescent lamp, and the gains of gain control amplifiers 19, 20 and 21 are set to corresponding values. When the output signals from light receiving elements 25 and 26 are both large, controller 22 determines that the light source is daylight, and the gains of gain control amplifiers 19, 20 and 21 are set to corresponding values. In the case of daylight, the gain of gain control amplifier 19 is continuously varied by variable resistor 34 so that the white balance is set over a wide range of conditions, from brilliant sunshine to cloudy daylight.

As is known for conventional still cameras, electronic flash units (also known as strobe lamps) are sometimes used in dimly lit conditions to provide adequate illumination for taking a photograph. It is to be noted that the color of the light from an electronic flash unit differs from an incandescent lamp, a fluorescent lamp, and daylight. When a video camera is used with such an electronic flash unit to take still pictures, the white balance is incorrectly set if one of the aforementioned settings is employed. An electronic camera in accord with the present invention will automatically set the white balance to an appropriate value so that the colors will be pleasantly reproduced.

Figure 4:
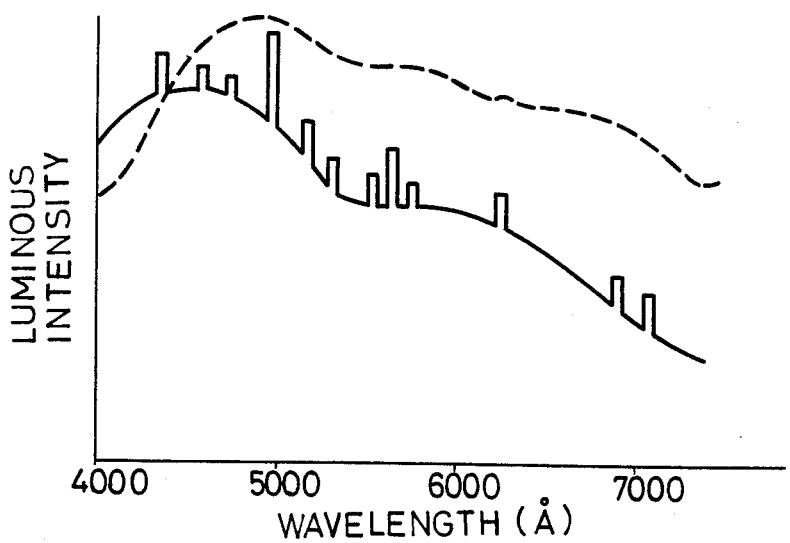
FIG. 4 is graphical illustration of luminous intensity versus the wavelength of the light from an electronic flash unit.

The operation of the present invention in conjunction with an electronic flash unit is next to be described. As illustrated in FIG. 4, the spectrum of light provided from an electronic flash unit, as indicated by the solid line curve, differs from that of daylight, as indicated by the dotted line curve. The white balance of an electronic camera must be correspondingly adjusted when it is used with such an electronic flash unit so that the color image produced therefrom is pleasing to a viewer.

In FIGS. 2 and 3, an on and off switch 35 is provided for an electronic flash unit 36. As depicted in FIG. 2, electronic flash unit 36 can be mounted on the upper portion of camera housing 1. Switch 35 for electronic flash unit 36 can be provided, for example, at the front of camera housing 1 (not shown in FIG. 2). As is known to those skilled in the art, when switch 35 is switched on, a battery (not shown) for the electronic flash unit 36 charges unit 36 to a predetermined voltage, whereupon unit 36 is placed in a standby mode. As depicted in FIG. 3, a charge or switching signal is supplied to controller 22 in response to the above conditions.

When the control signal is supplied to controller 22, controller 22 supplies appropriate control signals to gain control amplifiers 19, 20 and 21 so that the white balance is set in accord with the spectrum of an electronic flash unit. When the electronic flash unit is used, in other words, the white balance is automatically adjusted to correspond with the spectrum of the light emitted by an electronic flash (see the solid line curve of FIG. 4) based upon the signal supplied by switch 35. Thus, it is to be appreciated that no adjustment of the white balance needs to be performed with a reproducing or monitoring apparatus when an electronic flash unit is used with an electronic camera in accord with the present invention.

It is to be further appreciated that, since the white balance can be set automatically, a still camera can be used under a variety of conditions, and is especially portable. Thus, the camera can be easily operated for snap-shooting.

When the light source is daylight, the luminous intensity of the light in the near infrared spectrum is detected, and the level of the red primary color signal is continuously adjusted so that there are no undesirably abrupt changes in the white balance. The white balance is automatically and continuously adjusted when, for example, the video camera is moved to follow a subject which moves from one lighting condition to another, so that a pleasing image is always produced. The operator does not have to turn a knob as in the prior art to change the white balance of the camera when following a subject, and yet, a natural or pleasing image is easily produced.

When an electronic flash unit is used with an electronic camera in accord with the present invention, the white balance can be automatically adjusted to correspond to the spectra of the light emitted from the unit. When the image is subsequently monitored, or a hard copy is made, no further adjustments need to be made.

Figure 5A:
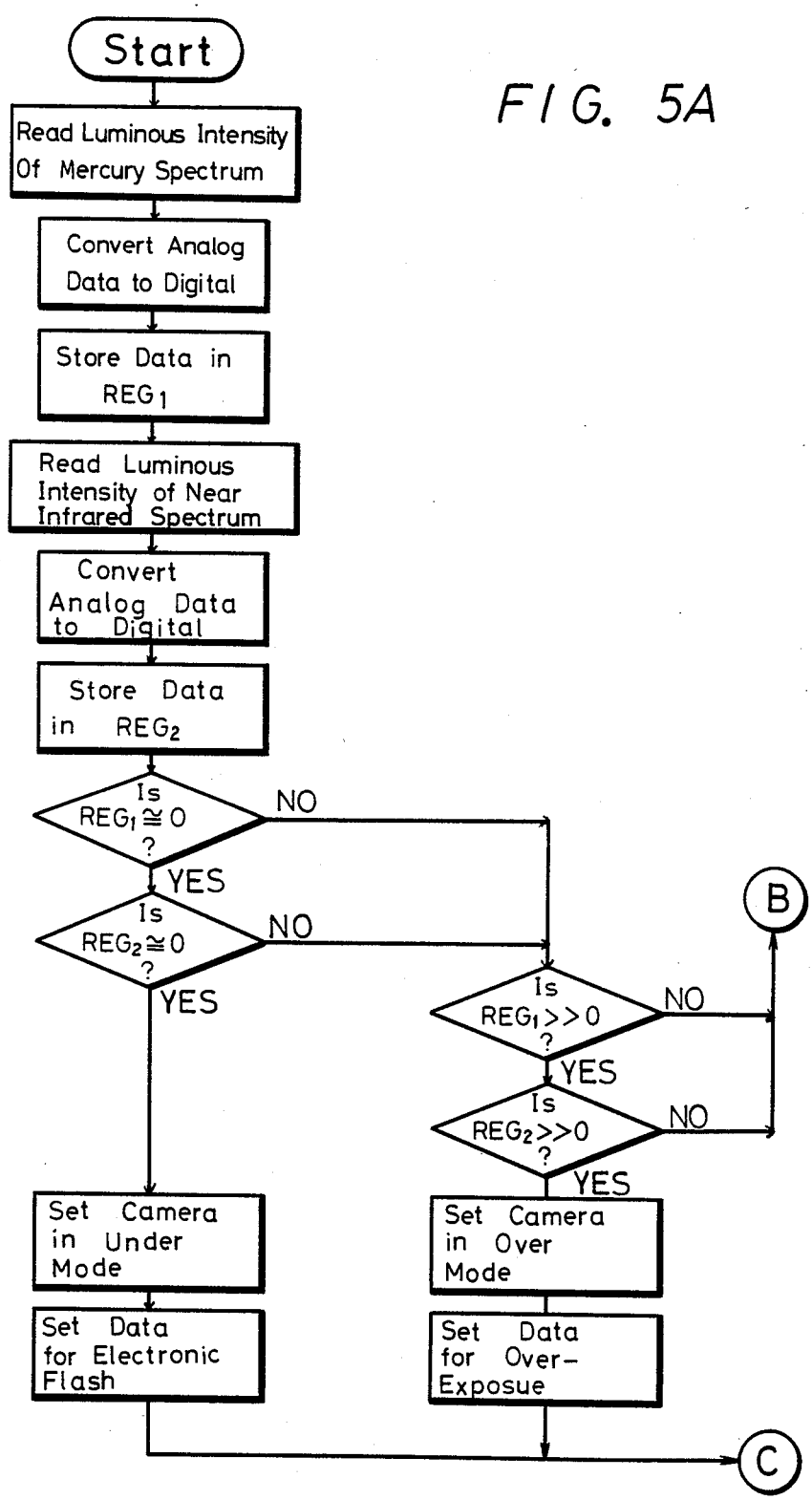
FIG. 5A and 5B are flowcharts for a programmed microprocessor which may be included in an electronic camera according to an embodiment of the present invention.
Figure 5B:
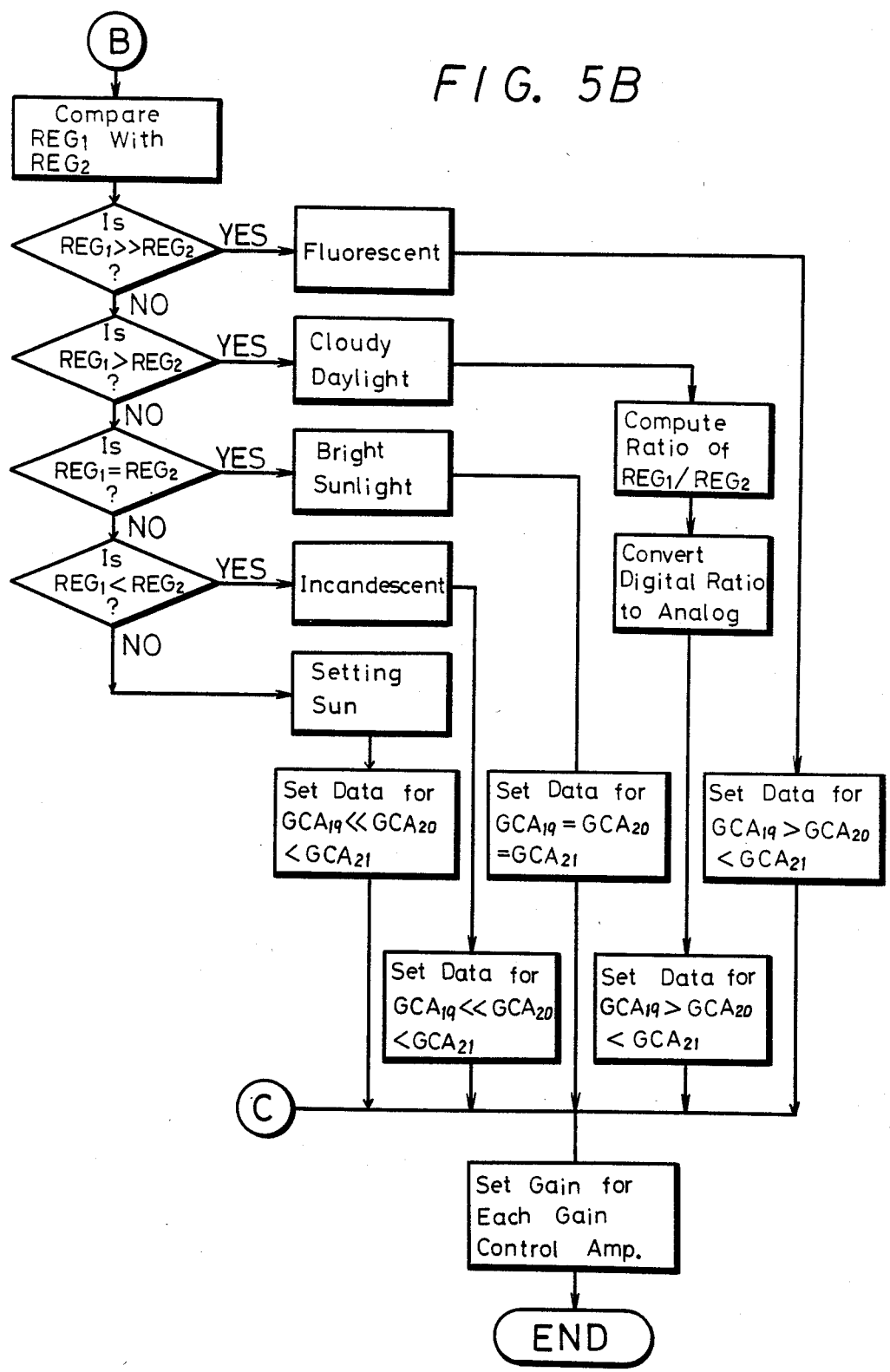

The flowchart of FIGS. 5A and 5B illustrates the programming used in connection with the microprocessor of controller 22. In FIG. 5A, the program reads the luminous intensity of the mercury spectrum as received by light receiving element 25. After the luminous intensity of the mercury spectrum has been read, the analog data therefrom is converted to digital data by analog to digital converter 31. The digital data is stored in comparator 32 in what can be, for example, a first region of a register. (In FIGS. 5A and 5B, the reference "$REG_1$" indicates a first memory region of the register included in comparator 32.) The program next reads the luminous intensity of the near infrared spectrum from light receiving element 26. (The detected near infrared spectrum may be, in a preferred embodiment, around 7,000 Å.) The analog data from light receiving element 26 is converted to digital data by analog to digital converter 31 and stored in $REG_2$. (As hereinbefore described, the reference "$REG_2$" indicates a second memory region in the register of comparator 32.)

After the digital data have been stored in $REG_1$ and $REG_2$, the program proceeds to a decision point where the data in $REG_1$ is checked to determine whether it is approximately 0. If the data in $REG_1$ is approximately 0, the program proceeds to a decision point where the data in $REG_2$ is checked to determine whether it is approximately 0. If the data in $REG_2$ is approximately 0, the program proceeds to place the camera in a mode identified as an UNDER mode, indicating that it is too dark for a picture to be taken in these conditions. (This mode is identified as the UNDER mode because a picture taken in this light would be underexposed.) After the camera has been placed in the UNDER mode, the program sets the data corresponding to illumination from an electronic flash unit, and the white balance of the camera is accordingly set. After the program has set the data for an electronic flash unit, it proceeds to point "C".

Returning a few steps in the flowchart, if the data in $REG_1$ or $REG_2$ is not approximately 0, the program proceeds to a decision point where it determines whether the data in $REG_1$ is very large in value. If the data in $REG_1$ is not of a very large value, the program proceeds to point "B". If the data in $REG_1$ is of a very large value, the program proceeds to a decision point to determine whether the data in $REG_2$ is of a very large value. If the data in $REG_2$ is not of a very large value, the program proceeds to point "B". If the data in $REG_2$ is of a very large value, the program proceeds to place the camera in a mode designated as an OVER mode, indicating that lighting conditions are too bright for a picture to be taken as it is presently set. (It is to be appreciated that this mode is called the OVER mode because a picture taken under these conditions would be overexposed.) The program then proceeds to set the data for the OVER mode. Controller 22 supplies control signals to diaphragm 3 (see FIG. 2) to close same, thereby reducing the amount of light supplied to CCD sensor 9. At the same time, the white balance is set for such conditions. The program then continues at point "C".

At point "B" in FIG. 5B, the data in $REG_1$ is compared to the data in $REG_2$ in comparator 32. After the comparison is made, the program proceeds to a series of decision points to determine the relationship between the data in $REG_1$ and in $REG_2$. The program identifies the source of the incident light as a result of the tests made at the decision points.

At the first decision point, the program determines whether the data in $REG_1$ is very much greater than the data in $REG_2$. If it is, the proram identifies the source of the incident light as a fluorescent lamp. Once the source has been identified as a fluorescent lamp, the program proceeds to set the data for gain control amplifiers (GCA) 19, 20 and 21 whereby the gain of gain control amplifier 19 is greater than the gain of gain control amplifier 20, and the gain of gain control amplifier 20 is less than the gain of gain control amplifier 21. Once the data for gain control amplifiers 19, 20, and 21 has been set, the program proceeds to set the gain for each control amplifier, and then ends.

Returning to the second decision point, the program determines whether the data in $REG_1$ is greater than the data in $REG_2$. If the data in $REG_2$ is greater than the data in the $REG_2$, the program identifies the source of incident light as cloudy daylight. The program proceeds to compute the ratio of the data in $REG_1$ and $REG_2$. After the ratio has been determined, the digital data are converted to analog data. The program proceeds to set the data for gain control amplifiers 19, 20 and 21 whereby the gain of gain control amplifier 19 is greater than the gain of gain controller 20, and the gain of gain control amplifier 20 is equal to the gain of gain control amplifier 21. As hereinbefore described, the gains for each of the gain control amplifiers are set, and the program terminates.

Returning to the third decision point, the program determines whether the data in $REG_1$ is equal to the data in $REG_2$. If the data in $REG_1$ is equal to the data in $REG_2$, the program identifies the source of the incident light as bright sunlight, and the program proceeds to set the data for gain control amplifiers 19, 20 and 21. In this case, the gains of all three gain control amplifiers 19, 20 and 21 are equal. As described before, the gain for each gain control amplifier is set, and the program terminates.

Returning to the fourth decision point, the program determines whether the data in $REG_1$ is less than the data in $REG_2$. If the data is less, the program determines that the source of the incident light is an incandescent lamp. The program proceeds to set the data for gain control amplifiers 19, 20 and 21 whereby the gain of gain control amplifier 19 is set less than the gain of gain control amplifier 20, which is less than the gain of gain amplifier 21. As before, the program proceeds to set the gain for each of the gain control amplifiers, and then terminates.

If the data in $REG_1$ is not less than the data of $REG_2$, from the fourth decision point, the program determines that the source of the incident light corresponds to a setting sun. The program proceeds to set the data for gain control amplifiers 19, 20 and 21 whereby the gain of gain controller amplifier 19 is very much less the gain of gain amplifier 20, which is less than the gain of gain control amplifier 21. The program proceeds to set the gains of the gain control amplifiers, and then terminates.

If, as described before with reference to FIG. 5A, the electronic camera is set in either the UNDER or the OVER modes, the program proceeds at point "C" and sets the gain for each of the gain control amplifiers as hereinbefore described, and the program terminates.

It is to be appreciated that when the white balance of an electronic camera is adjusted in accord with the present invention, and the reproduced image is supplied to a monitor or is used to generate a hard copy, no further adjustments to the white balance are required produce a pleasing image.

It is to be further appreciated that, in accord with the present invention, light receiving elements 25 and 26 are positioned on the upper portion of camera housing 1 to detect the light incident thereto. Even though the light from a subject is monochromatic light, for example, the source of the light can be accurately identified with the present invention.

Although a specific embodiment of the present invention has been described in detail herein with reference to the accompanying drawings, it is to be understood that the invention is not limited to that precise embodiment, and that various changes and modifications may be effected therein by one skilled in the art without departing from the spirit and scope of the invention as defined in the appended claims.

What is claimed is:

1. An electronic camera for use in incident light from various sources comprising:
means for producing a color image signal corresponding to an object in a field of view of the camera and having an adjustable white balance;
means for recording said color image signal on a record medium;
first light receivig means for generating a first signal in response to the luminous intensity of said incident light in the mercury spectrum;
second light receiving means for generating a second signal in response to luminous intensity of said incident light in the near infrared spectrum; and
means responsive to the relative values of said first and second signals for correspondingly adjusting said white balance to adapt the camera for use with incident light from a respective one of said source, said means for adjusting including means for separately receiving said first and second signals;
wherein said means for adjusting the white balance sets the latter for light from a fluorescent lamp when said first signal corresponds to a high luminous intensity in said mercury spectrum and said second signal corresponds to a low luminous intensity in said near infrared spectrum;
said means for adjusting the white balance sets the latter for light from an incandescent lamp when said first signal corresponds to a low luminous intensity in said mercury spectrum and said second signal corresponds to a high luminous intensity in said near infrared spectrum; and
said means for adjusting the white balance sets the latter for natural light when said first and second signals correspond to high luminous intensities in both said mercury spectrum and said near infrared spectrum.

2. The camera of claim 1; wherein said means for producing a color image signal includes means for separating said color image signal into red, blue and green color primary signals, and wherein said means for adjusting the white balance includes means for continuously varying the intensity of said red color signal in response to at least said second signal corresponding to said luminous intensity of said near infrared spectrum.

3. The camera of claim 1; and further comprising:
an electronic flash unit for transmitting light of a predetermined color to illuminate said object; and
means for coupling said electronic flash unit to said means for adjusting the white balance so that the latter adjusts said white balance corresponding to said predetermined color of said light from said electronic flash unit.

4. The camera of claim 1; and further comprising housing means with a forward slanting upper surface for receiving said first and second light receiving means whereby said light receiving means receive said incident light.

5. An electronic camera for use in incident light from various sources comprising;
means for producing a color image signal corresponding to an object in a field of view of the camera and having an adjustable white balance;
means for recording said color image signal on a record medium;
first light receiving means for generating a first signal in response to the luminous intensity of said incident light in the mercury spectrum;
second light receiving means for generating a second signal in response to the luminous intensity of said incident light in the near infrared spectrum; and
means responsive to the relative values of said first and second signals for correspondingly adjusting said white balance to adapt the camera for use with incident light from a respective one of said sources, said means for adjusting the white balance including multiplexer means for generating multiplexed output signals in response to said first and second signals from said first and second light receiving means;
said means for adjusting the white balance setting the latter for light from a fluorescent lamp when said first signal corresponds to a high luminous intensity in said mercury spectrum and said second signal corresponds to a low luminous intensity in said near infrared spectrum;
said means for adjusting the white balance setting the latter for light from an incandescent lamp when said first signal corresponds to a low luminous intensity in said mercury spectrum and said signal corresponds to a high luminous intensity in said near infrared spectrum; and
said means for adjusting the white balance setting the latter for natural light when said first and second signals correspond to high luminous intensities in both said mercury spectrum and said near infrared spectrum.

6. The camera of claim 5; wherein said means for adjusting the white balance includes log compressor means for logarithmically compressing said multiplexed output signals from said multiplexer means.

7. The camera of claim 6; wherein said means for adjusting the white balance includes analog to digital converting means for converting the logarithmically compressed multiplexed signals from said log compressor means to digital signals.

8. The camera of claim 7; wherein said means for adjusting the white balance includes comparator means for comparing said digital signals from said analog to digital converting means corresponding to said luminous intensities of said light in said mercury spectrum and said near infrared spectrum and generating comparison signals in response thereto.

9. The camera of claim 8; wherein said means for adjusting the white balance includes controller means for generating control signals in response to said comparison signals from said comparator means.

* * * * *